United States Patent [19]

Nomura et al.

[11] Patent Number: 4,967,374

[45] Date of Patent: Oct. 30, 1990

[54] CHARACTER DRAWING METHOD

[75] Inventors: Akihiro Nomura, Yamatokoriyama; Toshimi Kiyohara, Nara, both of Japan

[73] Assignee: Sharp Kabushiki Kaisha, Osaka, Japan

[21] Appl. No.: 223,615

[22] Filed: Jul. 25, 1988

[30] Foreign Application Priority Data

Jul. 31, 1987 [JP] Japan ............................. 62-193160

[51] Int. Cl.[5] ............................................ G06F 3/14

[52] U.S. Cl. .................................. 364/518; 364/521; 364/747

[58] Field of Search ............... 364/518, 364/519, 200 MS File, 364/900 MS File; 340/731, 724, 747, 750, 798, 799

[56] References Cited

U.S. PATENT DOCUMENTS

| | | | |
|---|---|---|---|
| 4,570,233 | 11/1986 | Yan et al. | 364/522 |
| 4,761,642 | 8/1988 | Huntzinger | 340/721 |
| 4,785,391 | 11/1988 | Apley et al. | 364/518 |
| 4,862,150 | 8/1989 | Katsura et al. | 340/703 |

FOREIGN PATENT DOCUMENTS 1353062 5/1987 Fed. Rep. of Germany .

*Primary Examiner*—Gary V. Harkcom
*Assistant Examiner*—Phu K. Nguyen

[57] ABSTRACT

A character drawing method for use in a bit map display system in which after sentence data constituted by character code data have been converted into character pattern data, a bit string for forming characters is transferred to a memory for display corresponding to pixels so as to be displayed. In the character drawing method, drawing of the characters is performed through optimum distribution of functions of processings to be executed such that the processings are executed in parallel by a multiprocessor.

7 Claims, 3 Drawing Sheets

CHARACTER DRAWING METHOD

BACKGROUND OF THE INVENTION

The present invention generally relates to a character drawing method and more particularly, to improvement in a dot character drawing method for use in office automation equipment such as a word processor, a work station, etc. It is especially useful in an apparatus requiring high-speed drawing of characters.

Conventionally, a character drawing method utilizing a central processing unit (CPU) has been so arranged such that a graphic processor, in which drawing and editing functions are incorporated into one chip of large scale integration (LSI) by a FIFO (first-in first-out) method or a prefetch method, sequentially receives parameters, commands, etc., prepared and formulated by a main processor, such that drawing is effected and thereby results in a fixed distribution of the functions.

In this known character drawing method, if a large load is concentrically applied to a specific one of the plurality of processors, according to data to be processed, the following problem arises. Namely, since the load cannot be distributed over all the processors although the remaining processors have sufficient processing capacity beyond loads applied thereto, a processing capacity of its system as a whole is governed by that of the specific processor, thereby resulting in a drop of the processing capacity of the system as a whole.

SUMMARY OF THE INVENTION

Accordingly, an essential object of the present invention is to provide, with a view at eliminating the above described drawback of the prior art character drawing method, a character drawing method in which eliminates the case of a large load being concentrically applied to a specific one of a plurality of processors according to data to be processed. In the present system portions of the overload applied to the specific processor are allotted to the remaining processors having sufficient processing capacity beyond load applied thereto, respectively at this time. Thus a processing capacity of the system as a whole is improved through a balanced distribution of functions of the system.

In order to accomplish this object of the present invention, a character drawing method according to the present invention employs not only a main CPU, but also a graphic CPU used exclusively for drawing characters. This optimum distribution of functions is performed between the main CPU and the graphic CPU.

In accordance with the present invention, since optimum distribution of the functions is performed such that concentric application of a large load to a specific processor is prevented, it becomes possible to effect the high-speed drawing of characters through parallel processing by the multiprocessor.

BRIEF DESCRIPTION OF THE DRAWINGS

This object and other features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
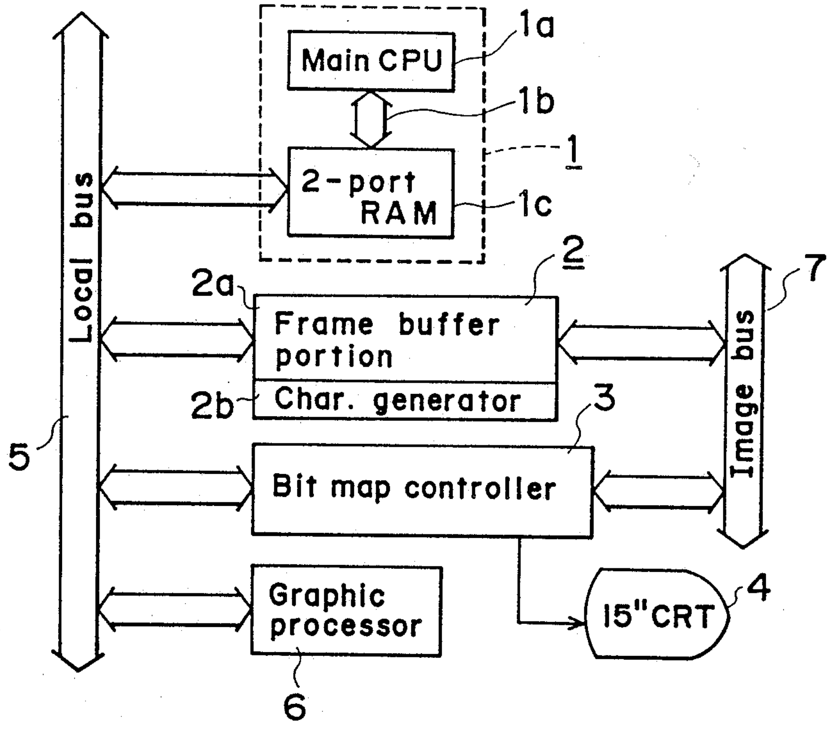
FIG. 1 is a block diagram of a system according to one embodiment of the present invention.

Referring now to the drawings, there is shown in FIG. 1, a system according to one embodiment of the present invention. In this embodiment, a main CPU 1*a*, e.g. "i80286" (name used in trade and manufactured by Intel Corp. of the U.S.) and a graphic processor 6 for image processing, e.g. "MN-8617" (name used in trade and manufactured by Matsushita Electric Industrial Co., Ltd. of Japan) are employed as a CPU. Namely, the system K includes a CPU board 1, a frame buffer 2, a bit map controller 3, a 15" cathode ray tube (CRT) display unit 4, a local bus 5, a graphic processor 6 and an image bus 7. The CPU board 1 includes the main CPU 1*a* and a dual port RAM 1*c* of 1 mega bytes, while the frame buffer 2 includes a frame buffer portion 2*a* constituted by a dual port RAM, and a 24×24 dot character generator 2*b* for storing character patterns of a dot font. The local bus 5 is constituted by a multibus, e.g. an IEEE-796 bus. One port of the dual port RAM 1*c*, one port of the frame buffer portion 2*a*, one port of the bit map controller 3 and one port of the graphic processor 6 are connected to the local bus 5. The other port of the frame buffer portion 2*a* and the other port of the bit map controller 3 are connected to the image bus 7. In the CPU board 1, the other port of the dual port RAM 1*c* is connected to the main CPU la through an internal bus 1*b*. The CRT display unit 4 is connected to the bit map controller 3. The dual port RAM 1*c* functions not only as a sentence buffer but as a memory for storing a program of the graphic processor 6 and a display table used at the time of display.

The character generator 2*b* converts character code data from the dual port RAM 1*c* into character pattern data and stores the character pattern data in the frame buffer portion 2*a*. The bit map controller 3 is provided for controlling the CRT display unit 4 and receives the display data of the frame buffer portion 2*a* from the image bus 7 and outputs the display data to the CRT display unit 4.

In the system of the present invention, distributed processing is performed by the main CPU 1*a* and the graphic processor 6 such that high-speed drawing of characters is effected. Distributed-function processing in the multiprocessor system of the present invention is schematically shown in Table 1 below in comparison with processing in a prior art single-processor system.

TABLE 1

| Prior Art | Present Invention Multiprocessor | |
|---|---|---|
| Single-processor | Main CPU | Graphic processor |
| Sentence buffer | Sentence buffer | |
| ↓ | ↓ | |
| Formulation of | Formulation of | Display table |

TABLE 1-continued

| Prior Art | Present Invention | |
|---|---|---|
| | Multiprocessor | |
| Single-processor | Main CPU | Graphic processor |
| display buffer ↓ | display table | ↓ |
| Drawing of characters | | Drawing of characters |

Table 1 compares character drawing processing of the system of the present invention with that of the prior art system. As can be seen from Table 1, in the prior art single-processor system, a display buffer of bits is formulated from character codes in a sentence buffer and then, character drawing is performed sequentially by the main CPU. On the other hand, in the multiprocessor system of the present invention, a display table is formulated from a sentence buffer by the main CPU 1*a*, while character drawing is performed from the display table by the graphic processor 6.

Figure 4:
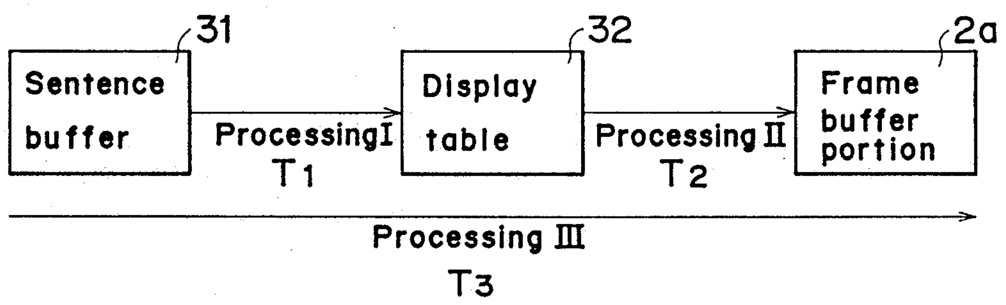
FIG. 4 is a schematic view showing processing of the system of FIG. 1.

FIG. 4 schematically shows processing performed by the system of the present invention. In FIG. 4, formulation of a corresponding display table 32 from character code data of a sentence buffer 31 in the dual port RAM 1*c* is referred to as "processing I"; formulation of the frame buffer portion 2*a* from the display table 32 is referred to as "processing II"; and a whole of the processings I and II is referred to as "processing III". According to experiments conducted by the present inventors, in the prior art sequential processing type character drawing method, 1.02 sec./1K characters is required in executing the processing III, while in the parallel processing type character drawing method of the present invention, merely 0.60 sec./1K characters is required for executing the processing III. This thereby results in a considerable reduction during execution time of the processing III.

Figure 5:
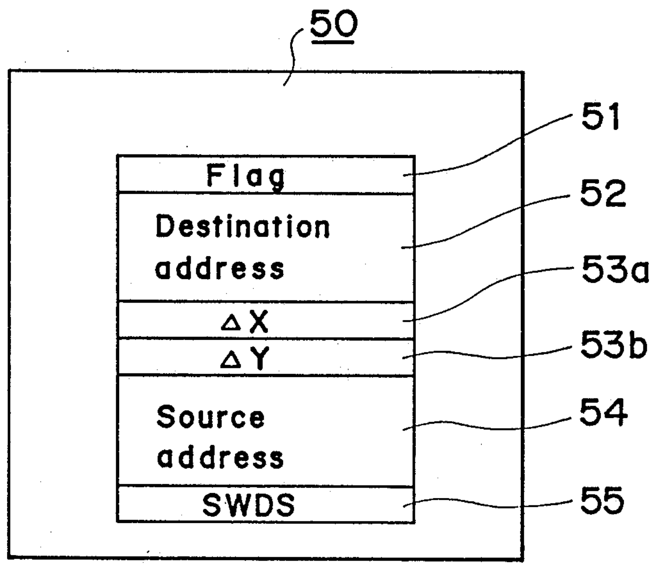
FIG. 5 is a view showing one example of a display table employed in the system of FIG. 1.

FIG. 5 shows one example of a display table element 50 for each of characters in the display table 32. Namely, the display table element 50 is formulated for each of the characters in the sentence buffer 31 and is constituted by a flag portion 51; a destination address portion 52 for indicating the position of each of the characters displayed in the frame buffer portion 2*a;* ΔX and ΔY portions 53*a* and 53*b* for indicating the size of a character dot pattern; a source address portion 54 for indicating a corresponding address of the character generator 2*b;* and a SWDS portion 55 for indicating the width of a significant data area.

Figure 2:
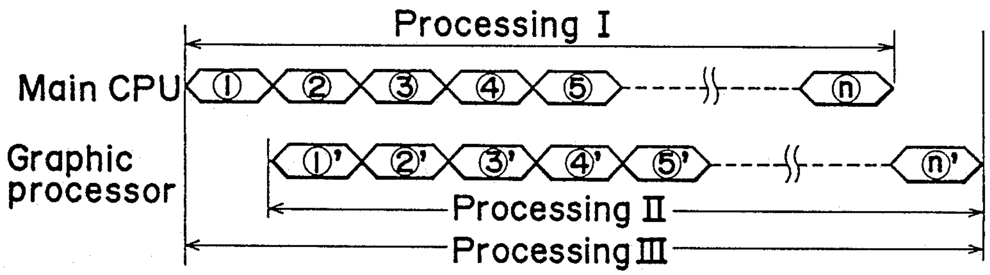
FIG. 2 is a timing chart of processing of the system of FIG. 1.

FIG. 2 is a timing chart in which n characters (n=integer number) are processed by the system of the present invention. In FIG. 2, the processing I of the main CPU 1*a*, in which the display table element 50 is formulated for each of the n characters in the sentence buffer 31, and the processing II of the graphic processor 6, in which the character pattern data corresponding to the content of the display table element 50 are written in the frame buffer portion 2*a*, are executed in parallel with each other. On the other hand, conventionally in prior art systems, it has been arranged such that these processings are performed sequentially, (namely, the processing I is initially executed and then, the processing II is executed) execution time is therefore approximately twice that of the present invention. Meanwhile, in this present embodiment, the display table 32 has a capacity of 200,000 bytes/1K characters and a parameter of 10 words is set for each of the characters. Furthermore, in the system of the present invention, change-over of the processings between the main CPU 1*a* and the graphic processor 6 is performed in accordance with the content of the flag portion 51 in the display table element 50 which assumes one of three values, i.e. "0" indicating an initial value, "1" indicating completion of setting of the parameter and "2" indicating completion of processing of one page.

Figure 3A:
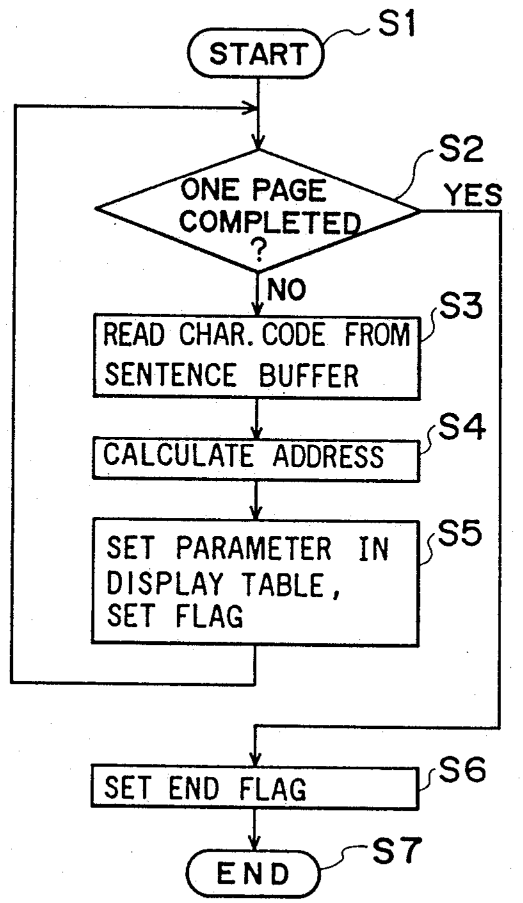
FIGS. 3*a* and 3*b* are flow charts showing processing sequences of the system of FIG. 1.
Figure 3B:
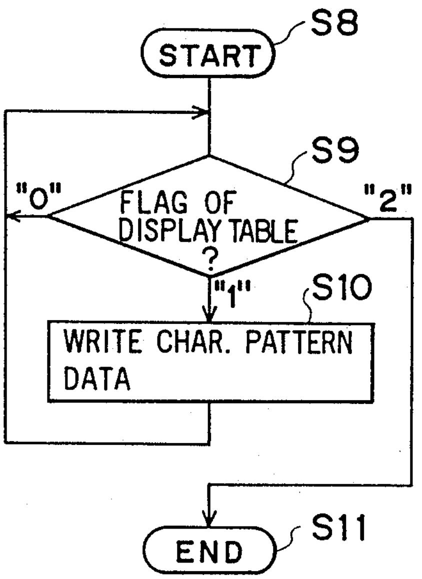

FIGS. 3*a* and 3*b* show processing sequences of the main CPU 1*a* and the graphic processor 6, respectively. As will be apparent from the foregoing, in FIG. 3*a*, until it is found at step S2 that processing of one page has been completed, the main CPU 1*a* continues execution of an operation in which the character codes are read from the sentence buffer 31 at step S3 and an address for writing the character codes in the display table element 50 is then calculated at step S4 and then, the flag portion 51 of the display table element 50 being set at step S5. Subsequently, at step S6, the main CPU 1*a* sets an end flag and thus, "processing I" has been executed.

On the other hand, in FIG. 3*b*, the graphic processor 6 checks, at step S9, the content of the flag portion 51 of the display table element 50. If it is found at step S9 that the content of the flag portion 51 is "0", a check of the content of the flag portion 51 is repeated. If it is found at step S9 that the content of the flag 51 is "1", the character pattern data are written at a predetermined location in the frame buffer portion 2*a* at step S10 with reference to the content of the display table element 50. Meanwhile, if it is found at step S9 that the content of the flag portion 51 is "2", the program flow directly ends at step S11 because processing of one page has been executed.

Meanwhile, in the system of the present invention, processing capacity of the main CPU 1*a* and the graphic processor 6 are determined by a system designer in consideration of a processing capacity of the whole system at the time of system design.

As is clear from the foregoing description, in accordance with the present invention, since conversion from the character code data to the character pattern data is subjected to distributed processing between the main CPU and the graphic processor, high-speed character drawing can be performed and the processing capacity of the whole system is increased through reduction of the load applied to the main CPU.

Although the present invention has been fully described by way of example with reference to the accompanying drawings, it is to be noted here that various changes and modifications will be apparent to those skilled in the art. Therefore, unless such changes and modifications otherwise depart from the scope of the present invention, they should be construed as being included therein.

What is claimed is:

1. A method for distributing processor functions between multiple processors to create an efficient character drawing system, said method comprising the steps of:

(a) entering character codes, corresponding to characters on a page of information, which are desired to be drawn, into a memory;

(b) sequentially assigning display parameters to each of said character codes by a first processor means;

(c) creating a display table by said first processor means sequentially entering each of said character codes and corresponding display parameters into said memory;

(d) setting a flag to 1 for each of said character codes, upon entering of said character codes into said display table by said first processor means;

(e) continually checking each of said display table flags with a second processor means;

(f) writing each of said character codes and said corresponding display parameters into a character generator means upon said second processor means recognizing each of said display flag has been set to 1;

(g) sequentially displaying each of said generated characters on a display means, thereby creating an efficient character drawing system wherein said first and second processor means sequentially perform character drawing operations continuously.

2. A method, as claimed in claim 1, wherein said first processor means is a CPU.

3. A method, as claimed in claim 1, wherein said second processor means is a graphic processor.

4. A method, as claimed in claim 1, further comprising the steps of:

(i) setting said flag to 2 for each of said character codes upon entering said entire page of information desired to be drawn, by said first processor means.

(j) continually checking each of said display table flags by said second processor means for flags set to 2; and (k) displaying said entire page of information desired to be drawn subsequent to said second processor means recognizing that said display table flags have been set to 2.

5. A character drawing system in which processor functions are distributed between multiple processors to create an efficient character drawing system for creating drawings of characters, said system comprising:

first storage means for storing entered character codes, corresponding to characters on a page of information, which are desired to be drawn;

first processor means, connected to said first means for storing, for sequentially assigning display parameters to each of said stored codes, said first processor means thereby creating a display table by sequentially entering each of said character codes and corresponding display parameters into said first storage means;

said first processor means further setting a flag to 1 for each of said character codes upon entering of said character codes into said display table;

second processor means, operatively connected to said first storage means, for continually checking each of said display table flags;

said second processor means sequentially transforming each of said character codes and said corresponding display parameters into a second storage means upon recognizing each of said display flags have been set to 1;

second storage means for sequentially storing said written character codes and corresponding display parameters;

character generating means, connected to said second storage means, for sequentially generating characters from said stored character codes and corresponding display parameters;

display means, operatively connected to said character generating means, for sequentially displaying each of said generating characters on said display means, thereby creating an efficient character drawing system wherein said first and second processor means sequentially perform character drawing operations continuously.

6. A system, as claimed in claim 5, wherein said first processor means is a CPU.

7. A system, as claimed in claim 5, wherein said second processor means is a graphic processor.

* * * * *